US009663736B2

(12) United States Patent
Papin et al.

(10) Patent No.: US 9,663,736 B2
(45) Date of Patent: May 30, 2017

(54) ADDITIVE FOR IMPROVING THE OXIDATION AND/OR STORAGE STABILITY OF MOTOR FUELS OR LIQUID HYDROCARBON-CONTAINING FUELS

(71) Applicant: TOTAL MARKETING SERVICES, Puteaux (FR)

(72) Inventors: Géraldine Papin, Lyons (FR); Frédéric Tort, Brignais (FR); Christian Vermorel, Lyons (FR); Pauline Croc, Tartaras (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 14/786,364

(22) PCT Filed: Apr. 18, 2014

(86) PCT No.: PCT/EP2014/058014
§ 371 (c)(1),
(2) Date: Oct. 22, 2015

(87) PCT Pub. No.: WO2014/173844
PCT Pub. Date: Oct. 30, 2014

(65) Prior Publication Data
US 2016/0068776 A1  Mar. 10, 2016

(30) Foreign Application Priority Data
Apr. 25, 2013  (FR) ........................ 13 53765

(51) Int. Cl.
*C10L 1/238* (2006.01)
*C08G 8/28* (2006.01)

(52) U.S. Cl.
CPC ............ *C10L 1/238* (2013.01); *C08G 8/28* (2013.01); *C10L 2200/0259* (2013.01); *C10L 2200/0446* (2013.01); *C10L 2200/0476* (2013.01); *C10L 2230/081* (2013.01); *C10L 2230/14* (2013.01)

(58) Field of Classification Search
USPC ............................................. 44/415; 525/472
See application file for complete search history.

(56) References Cited

U.S. PATENT DOCUMENTS

| 4,511,369 | A | 4/1985 | Denis et al. |
| 4,652,273 | A | 3/1987 | Maldonado et al. |
| 4,664,676 | A | 5/1987 | Denis et al. |
| 4,731,095 | A | 3/1988 | Garapon et al. |
| 4,900,332 | A | 2/1990 | Denis et al. |
| 5,039,437 | A | 8/1991 | Martella et al. |
| 5,106,515 | A | 4/1992 | Denis et al. |
| 5,256,740 | A | 10/1993 | Denis et al. |
| 5,449,386 | A | 9/1995 | Denis et al. |
| 5,456,730 | A | 10/1995 | Hart et al. |
| 5,730,029 | A | 3/1998 | Stoldt et al. |
| 5,998,530 | A | 12/1999 | Krull et al. |
| 6,071,318 | A | 6/2000 | Mallet et al. |
| 6,083,287 | A | 7/2000 | Germanaud et al. |
| 6,511,520 | B1 | 1/2003 | Eber et al. |
| 6,592,639 | B2 | 7/2003 | Bernasconi et al. |
| 8,298,402 | B2 | 10/2012 | Krull et al. |
| 8,535,515 | B2 | 9/2013 | Cholley et al. |
| 9,102,767 | B2 | 8/2015 | Dolmazon et al. |
| 2005/0223631 | A1 | 10/2005 | Jackson |
| 2007/0027041 | A1* | 2/2007 | Krull ............... C10L 1/143 508/390 |
| 2010/0075876 | A1 | 3/2010 | Claydon |
| 2010/0275508 | A1 | 11/2010 | Dolmazon et al. |
| 2010/0281762 | A1 | 11/2010 | Chevrot et al. |
| 2012/0010112 | A1 | 1/2012 | Grabarse et al. |
| 2012/0102825 | A1 | 5/2012 | Chevrot et al. |
| 2013/0255139 | A1 | 10/2013 | Dolmazon et al. |
| 2014/0107005 | A1 | 4/2014 | Ahlers et al. |
| 2014/0157655 | A1 | 6/2014 | Tort et al. |
| 2015/0113863 | A1 | 4/2015 | Papin et al. |

FOREIGN PATENT DOCUMENTS

| EP | 0261959 | A2 | 3/1988 |
| EP | 0271385 | A1 | 6/1988 |
| EP | 663000 | A1 | 7/1995 |
| EP | 0674689 | A1 | 10/1995 |
| EP | 680506 | A1 | 11/1995 |
| EP | 0736590 | A2 | 10/1996 |
| EP | 1584673 | A1 | 10/2005 |
| EP | 1847583 | * | 10/2007 |
| FR | 2528051 | A1 | 12/1983 |
| FR | 2528423 | A1 | 12/1983 |
| FR | 2772783 | A1 | 6/1999 |
| WO | WO-9314178 | A1 | 7/1993 |
| WO | WO-2012004300 | A1 | 1/2012 |

* cited by examiner

*Primary Examiner* — Prem C Singh
*Assistant Examiner* — Chantel Graham
(74) *Attorney, Agent, or Firm* — Harness, Dickey & Pierce, P.L.C.

(57) ABSTRACT

The present disclosure relates to the use of at least one modified alkylphenol-aldehyde resin as additive for improving the oxidation and/or storage stability of a motor fuel or liquid hydrocarbon-containing fuel composition. The modified alkylphenol-aldehyde resin can be obtained by Mannich reaction of an alkylphenol-aldehyde condensation resin
  with at least one aldehyde and/or one ketone having from 1 to 8 carbon atoms, preferably from 1 to 4 carbon atoms;
  and at least one hydrocarbon-containing compound having at least one alkylmonoamine or alkylpolyamine (alkylamine) group, having between 1 and 30 carbon atoms.
The alkylphenol-aldehyde condensation resin itself can be obtained by condensation
  of at least one alkylphenol substituted with at least one linear or branched alkyl group having from 1 to 30 carbon atoms, preferably a monoalkylphenol,
  with at least one aldehyde and/or one ketone having from 1 to 8 carbon atoms, preferably from 1 to 4 carbon atoms.

20 Claims, 1 Drawing Sheet

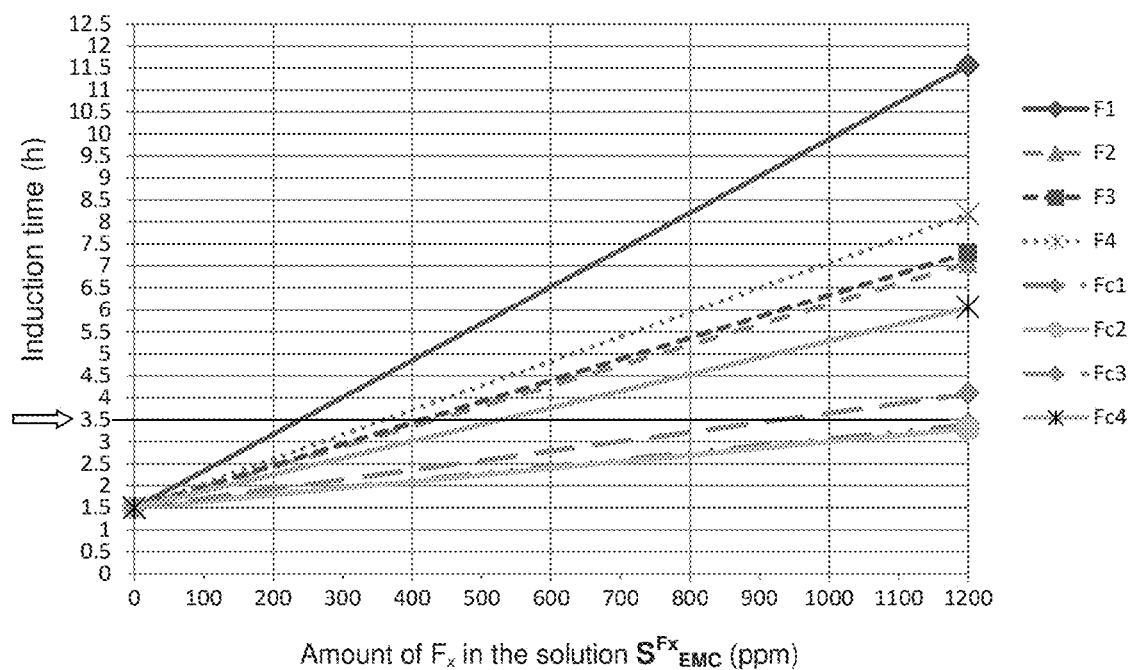

ADDITIVE FOR IMPROVING THE OXIDATION AND/OR STORAGE STABILITY OF MOTOR FUELS OR LIQUID HYDROCARBON-CONTAINING FUELS

CROSS-REFERENCE TO RELATED APPLICATIONS

This application is a National Phase Entry of International Application Serial No. PCT/EP2014/058014 filed on Apr. 18, 2014, which claims priority to French Patent Application Serial No. 1353765, filed on Apr. 25, 2013, both of which are incorporated by reference herein.

TECHNICAL FIELD

The present invention relates to the use of a modified alkylphenol-aldehyde resin in compositions of motor fuels or liquid hydrocarbon-containing fuels.

BACKGROUND AND SUMMARY

It is well known to a person skilled in the art that certain motor fuels or liquid hydrocarbon-containing fuels stored in the presence of air for long periods of time are subject to the formation of solid deposits, in particular at low temperature. These problems of deposits are connected with the presence of unstable molecules contained in the motor fuels or liquid hydrocarbon-containing fuels. These unstable molecules oxidize easily in the presence of oxygen, in particular in the light, under the effect of ultraviolet (UV) radiation, and/or in the presence of traces of metals, which catalyse the oxidation reaction and therefore promote the formation of deposits. The unstable molecules which are sensitive to oxidation are mainly molecules containing unsaturations, for example olefins in gasolines, fatty acid methyl or ethyl esters (FAME and FAEE), esters of animal fats or other sources of triglycerides in biodiesels or olefins and partially hydrogenated aromatics in the cuts of distillates originating from catalytic or thermal cracking of products originating from petroleum refining.

The deposits that accumulate on the filters cause obstruction of the filters. A great many additives used for reducing the formation of deposits have been described extensively in the literature. Among the solutions proposed, the use of conventional antioxidants such as the phenolic or amine antioxidants has been proposed. By way of illustration, application US2010/0075876 may be mentioned, which proposes a composition comprising at least one cyclic amine antioxidant, for example diphenylamine and a phenolic antioxidant, 2,6-di-tert-butyl-4-methylphenol (BHT).

The technical problem that the invention aims to solve is to improve the oxidation and/or storage stability of compositions of motor fuels or liquid hydrocarbon-containing fuels. The present invention aims in particular to stabilize a biodiesel of type B100 in order to obtain a value of Rancimat induction time (Tind) according to standard EN 15751 greater than or equal to 8 hours. A particular aim of the invention is to obtain a gain in the induction time value (ΔTind) greater than or equal to 2.

The alkylphenol-aldehyde resins originating from the condensation of alkylphenol and aldehyde have long been known as flow improvers for mineral oils: see for example EP 311 452, which describes products of condensation of at least 80 mol % of dialkylphenols and aldehydes having from 1 to 30 carbon atoms; EP 857 776, which describes the use of alkylphenol-aldehyde resins in which the alkyl groups of the alkylphenol have from 4 to 12 carbon atoms and the aldehyde from 1 to 4 carbon atoms and not containing more than 10 mol % of alkylphenols having more than one alkyl group, in combination with ethylene/vinyl ester copolymers or terpolymers for improving the fluidity of mineral oils; EP1 584 673, which describes alkylphenol-aldehyde resins with $M_n$ between 1000 and 3000 originating from the condensation of a C1-C4 aldehyde and a mixture of alkylphenols, predominantly monoalkylphenol, the alkyl group having from 1 to 20 carbon atoms, intended for improving the low-temperature flow properties of motor fuel compositions. Modified alkylphenol-aldehyde resins have also been proposed as additives for improving the low-temperature flow of mineral oils: EP 1 767 610 describes alkylphenol resins the condensation reaction of which with the aldehydes is carried out in the presence of fatty acids having from 2 to 50 carbon atoms, or derivatives thereof, such as esters. In patent application WO2012/085865 and more recently in application FR2012/55755, the applicant proposed novel modified alkylphenol-aldehyde resins, usable for improving the lowtemperature stability of motor fuels and liquid hydrocarbon-containing fuels.

Continuing this research, the applicant discovered a novel use of these modified alkylphenol-aldehyde resins in compositions of motor fuels or liquid hydrocarbon-containing fuels. In particular, the present invention relates to the use of at least one modified alkylphenol-aldehyde resin as additive for improving the oxidation and/or storage stability of a motor fuel or liquid hydrocarbon-containing fuel composition, said modified alkylphenol-aldehyde resin can be obtained by Mannich reaction of an alkylphenol-aldehyde condensation resin with at least one aldehyde and/or one ketone having from 1 to 8 carbon atoms, preferably from 1 to 4 carbon atoms;

and at least one hydrocarbon-containing compound having at least one alkylmonoamine or alkylpolyamine (alkylamine) group, having between 1 and 30 carbon atoms, preferably between 4 and 30 carbon atoms, said alkylphenol-aldehyde condensation resin itself can be obtained by condensation of at least one alkylphenol substituted with at least one linear or branched alkyl group having from 1 to 30 carbon atoms, preferably a monoalkylphenol, with at least one aldehyde and/or one ketone having from 1 to 8 carbon atoms, preferably from 1 to 4 carbon atoms.

According to a particular embodiment, said use makes it possible to improve the storage stability of the motor fuel or liquid hydrocarbon-containing fuel composition at a temperature less than 0° C., preferably less than −5° C., more preferably less than or equal to −10° C. According to another particular embodiment, this use makes it possible to reduce the quantity of deposits formed during the storage of the motor fuel or liquid hydrocarbon-containing fuel composition. According to another preferred particular embodiment, the modified alkylphenol-aldehyde resin can be obtained from at least one alkylphenol substituted in the para position, preferably starting from p-nonylphenol.

According to another preferred particular embodiment, the modified alkylphenol-aldehyde resin can be obtained from at least one aldehyde and/or one ketone selected from formaldehyde, acetaldehyde, propionaldehyde, butyraldehyde, 2-ethylhexanal, benzaldehyde, acetone, and preferably from at least formaldehyde. According to one variant, the modified alkylphenol-aldehyde resin can be obtained from at least one alkylamine having at least one primary amine group, and advantageously at least one compound in which all the amine groups are primary amines. According to another variant, the modified alkylphenol-aldehyde resin can be obtained from p-nonylphenol, formaldehyde and at least one hydrocarbon-containing compound having at least one alkylmonoamine or alkylpolyamine group.

According to another preferred particular embodiment, the modified alkylphenol-aldehyde resin can be obtained from at least one fatty-chain alkylamine or from a mixture of fatty-chain alkylamines, and preferably from alkylamine(s) having a number of carbon atoms between 12 and 24, preferably between 12 and 22. According to one variant, the modified alkylphenol-aldehyde resin has a viscosity at 50° C. measured using a dynamic rheometer at a shearing rate of 100 s$^{-1}$ on a solution of said resin diluted with 30% by weight of an aromatic solvent comprised between 1000 and 10000 mPa·s, preferably between 1500 and 6000 mPa·s and advantageously between 2500 and 5000 mPa·s.

According to certain particular embodiments, the object of the invention also has one or more features listed below:
  the modified alkylphenol-aldehyde resin is used as an additive in a form diluted in a solvent, preferably aromatic.
  the modified alkylphenol-aldehyde resin is used in the motor fuel or liquid hydrocarbon-containing fuel composition in combination with one or more additional additives.
  the additional additives are selected from dispersants/detergents, carrier oils, metal deactivators, metallic passivators, antioxidants, dyes, antistatic additives, corrosion inhibitors, biocides, markers, thermal stabilizers, emulsifiers, friction reducing agents, surfactants, cetane improvers, anti-clouding agents, additives improving the conductivity, reodorants, lubricity additives, lubricants and mixtures thereof.
  a quantity of modified alkylphenol-aldehyde resin comprised between 5 and 5000 ppmw, preferably between 10 and 2000 ppm, more preferably between 50 and 1200 ppm, even more preferably between 50 and 600 ppm, is added to the motor fuel or liquid hydrocarbon-containing fuel composition.
  the motor fuel or liquid hydrocarbon-containing fuel composition comprises a motor fuel or liquid hydrocarbon-containing fuel selected from gas oils, diesel fuels, gasolines, biofuels, jet fuels, domestic fuel oils (DFO) and heavy fuel oils.
  the motor fuel or liquid hydrocarbon-containing fuel composition comprises a motor fuel or other fuel selected from the middle distillates with a boiling point temperature comprised between 100 and 500° C., preferably 140 to 400° C.
  the motor fuel or liquid hydrocarbon-containing fuel composition comprises vegetable and/or animal oils and/or esters thereof and/or biodiesels of animal and/or vegetable origin, preferably the esters are fatty acid methyl esters (FAME) or fatty acid ethyl esters (FAEE), in particular vegetable oil methyl esters (VOME) or vegetable oil ethyl esters (VOEE).
  the motor fuel or liquid hydrocarbon-containing fuel composition is a biodiesel of type B100, whose value of induction time ($T_{ind}$) obtained by a Rancimat test according to standard EN 15751 is greater than or equal to 8 hours, advantageously a gain in value of induction time ($\Delta T_{ind}$) obtained by the Rancimat test according to standard EN 15751 is greater than or equal to 2.

BRIEF DESCRIPTION OF THE DRAWINGS

Other advantages and features will become apparent from the description given below. The particular embodiments of the invention are given as non-limitative examples and are represented in the single attached drawing in which:
  FIG. 1 shows the quantity of additive Fx added to the solution SFxCME (ppm) as a function of the induction time obtained according to a Rancimat test (standard EN 15751). Other advantages and features will become apparent from the following description of particular embodiments of the invention given as non-limitative examples.

DETAILED DESCRIPTION

According to a first particular embodiment, a motor fuel or liquid hydrocarbon-containing fuel composition comprises at least one modified alkylphenol-aldehyde resin. In particular, a quantity of modified alkylphenol-aldehyde resin preferably comprised between 1 and 5000 ppmw, preferably between 5 and 2000 ppm, more preferably between 10 and 1200 ppm, even more preferably between 50 and 600 ppm, is added to the motor fuel or liquid hydrocarbon-containing fuel composition. For these ranges of product added, the modified alkylphenol-aldehyde resin is regarded as an additive.

The modified alkylphenol-aldehyde resin is obtained by Mannich reaction of an alkylphenol-aldehyde condensation resin:
  with at least one aldehyde and/or one ketone having from 1 to 8 carbon atoms, preferably from 1 to 4 carbon atoms;
  and at least one hydrocarbon-containing compound having at least one alkylmonoamine or alkylpolyamine group having between 1 and 30 carbon atoms, preferably between 4 and 30 carbon atoms, called hereinafter "alkylamine" for simplicity and clarity.

The alkylphenol-aldehyde condensation resin is itself obtained by condensation:
  of at least one alkylphenol substituted with at least one linear or branched alkyl group having from 1 to 30 carbon atoms, preferably a monoalkylphenol,
  with at least one aldehyde and/or one ketone having from 1 to 8 carbon atoms, preferably from 1 to 4 carbon atoms.

The modified alkylphenol-aldehyde resin according to the invention is, advantageously, obtained starting from at least one para-substituted alkylphenol. Nonylphenol will preferably be used. The preferred average number of phenol nuclei per molecule of nonylphenol-aldehyde resin is preferably greater than 6 and less than or equal to 25, and more preferably comprised between 8 and 17, and even more preferably between 9 and 16, phenol nuclei per molecule. The number of phenol nuclei can be determined by nuclear magnetic resonance (NMR) or gel permeation chromatography (GPC). According to a variant, the modified alkylphenol-aldehyde resin can be obtained starting from at least one aldehyde and/or one ketone selected from formaldehyde, acetaldehyde, propionaldehyde, butyraldehyde, 2-ethylhexanal, benzaldehyde, acetone, preferably at least formaldehyde.

According to a particular embodiment, the modified alkylphenol-aldehyde resin is obtained from at least one alkylamine having at least one primary and/or secondary amine group. In particular, the alkylamine is selected from the primary or secondary amines substituted with, respectively, one or two alkyl groups, preferably with 12 and 24 carbon atoms, more preferably with 12 and 22 carbon atoms. According to a preferred variant, the modified alkylphenol-aldehyde resin is obtained from at least one alkylamine having at least one primary amine group. In particular, the modified alkylphenol-aldehyde resin can advantageously be obtained starting from at least one alkylamine having at least one primary amine group and at least one compound in which all the amine groups are primary amines. The alkylamine is preferably a fatty-chain alkylamine having between 12 and 24 carbon atoms, preferably between 12 and 22 carbon atoms.

According to another preferred variant, the modified alkylphenol-aldehyde resin is obtained starting from at least one alkylamine having at least one primary amine group and comprising a fatty chain having between 12 and 24 carbon atoms, preferably between 12 and 20 carbon atoms. The commercial alkylamines are not generally pure compounds, but mixtures. Among the alkylamines marketed that are suitable, the fatty-chain alkylamines marketed under the names: Noram®, Trinoram®, Duomeen®, Dinoram®, Trinoram®, Triameen®, Armeen®, Polyram®, Lilamin® and Cemulcat® may be mentioned in particular. As a preferred example, Trinoram S may be mentioned, which is a tallow dipropylenetriamine, also known under the name N-(tallowalkyl)dipropylenetriamine.

According to a particular embodiment, the modified alkylphenol-aldehyde resin is used as an additive in a form diluted in a solvent or a dispersant. As an example, the solvent or dispersant is selected from the aliphatic and/or aromatic hydrocarbons or mixtures of hydrocarbons, for example the fractions of gasoline, kerosene, decane, pentadecane, toluene, xylene, ethylbenzene, mixtures of commercial solvents such as Solvarex 10, Solvarex 10 LN, Solvent Naphtha, Shellsol AB, Shellsol D, Solvesso 150, Solvesso 150 ND, Solvesso 200, Exxsol, ISOPAR. The solvent or dispersant is preferably aromatic. The solvent or dispersant used can also contain a polar dissolution adjuvant, such as 2-ethylhexanol, decanol, isodecanol and/or isotridecanol.

The concentration by weight of the modified alkylphenol-aldehyde resin diluted in the solvent or dispersant can advantageously vary from 1 to 99.5%, preferably from 5 to 95%, more preferably from 10 to 90% and even more preferably from 30 to 90%. The viscosity of the modified alkylphenol-aldehyde condensation resin, diluted with 30% by weight of aromatic solvent measured at 50° C. using a dynamic rheometer with a shearing rate of 100 $s^{-1}$ is preferably comprised between 1000 and 10000 mPa·s, preferably between 1500 and 6000 mPa·s, and advantageously between 2500 and 5000 mPa·s.

The modified alkylphenol-aldehyde resin can also be used in a motor fuel or liquid hydrocarbon-containing fuel composition in combination with one or more additional additives. Besides the modified alkylphenol-aldehyde resin described above, the motor fuel or liquid hydrocarbon-containing fuel composition can contain additional additives selected from dispersants/detergents, carrier oils, metal deactivators, metallic passivators, antioxidants, dyes, anti-static additives, corrosion inhibitors, biocides, markers, thermal stabilizers, emulsifiers, friction reducing agents, surfactants, cetane number improvers, anti-clouding agents, additives improving the conductivity, reodorants, lubricity additives, lubricants and mixtures thereof.

Among the other additional additives, the following may be mentioned in particular:

a) procetane additives, in particular selected from (but not limited to) the alkyl nitrates, preferably 2-ethylhexyl nitrate, the aroyl peroxides, preferably benzyl peroxide, and the alkyl peroxides, preferably ditert-butyl peroxide;
b) antifoaming additives, in particular selected from (but not limited to) the polysiloxanes, the oxyalkylated polysiloxanes, and the amides of fatty acids originating from vegetable or animal oils; examples of such additives are given in EP0861182, EP0663000, EP0736590;
c) detergent and/or anti-corrosion additives, in particular selected from (but not limited to) the group consisting of the amines, succinimides, alkenylsuccinimides, polyalkylamines, polyalkyl polyamines and polyetheramines; examples of such additives are given in EP0938535, US2012/0010112 and WO2012/004300;
d) lubricity additives or anti-wear agents, in particular selected from (but not limited to) the group consisting of the fatty acids and the ester or amide derivatives thereof, in particular glycerol monooleate, and the derivatives of mono- and polycyclic carboxylic acids; examples of such additives are given in the following documents: EP0680506, EP0860494, WO1998/04656, EP0915944, FR2772783, FR2772784;
e) cloud point additives, in particular selected from (but not limited to) the group consisting of the long-chain olefin/(meth)acrylic ester/maleimide terpolymers, and the polymers of esters of fumaric/maleic acids. Examples of such additives are given in EP0071513, EP0100248, FR2528051, FR2528051, FR2528423, EP112195, EP0172758, EP0271385, EP0291367;
f) anti-sedimentation additives and/or paraffin dispersants in particular selected from (but not limited to) the group consisting of the (meth)acrylic acid/alkyl (meth)acrylate copolymers amidated with a polyamine, the polyamine alkenylsuccinimides, the derivatives of phthalamic acid and of double-chain fatty amine; alkylphenol/aldehyde resins different from the alkylphenol/aldehyde resins according to the invention; examples of such additives are given in EP0261959, EP0593331, EP0674689, EP0327423, EP0512889, EP0832172, US2005/0223631, U.S. Pat. No. 5,998,530, WO1993/014178;
g) polyfunctional additives for low temperature operability in particular selected from the group consisting of the polymers based on olefin and alkenyl nitrate as described in EP0573490;
h) additives for improving low-temperature performance and filterability (CFI), such as the ethylene/vinyl acetate (EVA) copolymers and/or ethylene/vinyl propionate (EVP) copolymers, the ethylene/vinyl acetate/vinyl versatate (E/VA/VEOVA) terpolymers; the amidated maleic anhydride/alkyl(meth)acrylate copolymers can be obtained by reaction of a maleic anhydride/alkyl(meth)acrylate copolymer and an alkylamine or polyalkylamine having a hydrocarbon-containing chain from 4 to 30 carbon atoms, preferably from 12 to 24 carbon atoms; the amidated alpha-olefin/maleic anhydride copolymers can be obtained by reaction of a copolymer of alpha-olefin/maleic anhydride and an alkylamine or polyalkylamine, where the alpha-olefin can be selected from the $C_{12}$-$C_{40}$, preferably $C_{16}$-$C_{20}$ alpha-olefin and the alkylamine or polyalkylamine having, advantageously, a hydrocarbon-containing chain from 4 to 30 carbon atoms, preferably from 12 to 24 carbon atoms. As examples of terpolymers, those described in EP01692196, WO2009/106743 and WO2009/106744 may be mentioned.
i) other antioxidants of the hindered phenol type or alkylated amine antioxidants of the paraphenylene diamine type;
j) metal passivators, such as triazoles, alkylated benzotriazoles and alkylated tolutriazoles;
k) metal sequestering agents such as disalicylidene propanediamine (DMD);
l) acidity neutralizers such as the cyclic alkylamines.

In particular, the motor fuel and liquid hydrocarbon-containing fuel composition can contain, in addition to the modified alkylphenol-aldehyde resin, a filterability additive or a combination of a first and a second filterability additive as described in patent application FR2012/055755 filed on 19 Jun. 2012 by the applicant, cited as an example and incorporated by way of reference in the present application. The motor fuel and liquid hydrocarbon-containing fuel composition can advantageously contain a filterability additive selected from:

terpolymers of $C_4$ to $C_{22}$, preferably $C_{18}$ to $C_{22}$, alkyl (meth)acrylate, of $C_{20}$ to $C_{24}$ alpha-olefin and of N-substituted maleimide with a hydrocarbon-containing chain having between 4 and 30, preferably between 14 and 20, more preferably between 16 and 18 carbon atoms, it being understood that the closed N-substituted maleimide structure may also, depending on the conditions of use or storage, open so that it has an open amide/ammonium salt or diamide structure, $C_1$ to $C_{40}$ alkyl (meth)acrylate homopolymers, preferably $C_1$ to $C_{40}$, more preferably $C_8$ to $C_{24}$, alkyl polyacrylates, ammonium salts of mono- or polycarboxylic acid comprising at least one hydrocarbon-containing chain, linear or branched, saturated or unsaturated and having between 4 and 30 carbon atoms.

The combination of a first and a second filterability additive can correspond to at least one first filterability additive selected from the $C_1$ to $C_{40}$ alkyl (meth)acrylate homopolymers, preferably the $C_8$ to $C_{24}$ alkyl polyacrylates and at least one second filterability additive selected from:

terpolymers of $C_4$ to $C_{22}$ alkyl (meth)acrylate, of $C_{20}$ to $C_{24}$ alpha-olefin and of N-substituted maleimide with a hydrocarbon-containing chain having between 4 and 30 carbon atoms, ammonium salts of mono- or polycarboxylic acid comprising at least one hydrocarbon-containing chain, linear or branched, saturated or unsaturated and having between 4 and 30 carbon atoms.

Each additive can be incorporated separately in the motor fuel and liquid hydrocarbon-containing fuel composition, optionally diluted with one or more solvent or dispersant agents described above. According to one variant, compositions of additives can, for example, be prepared before incorporation in the motor fuel and liquid hydrocarbon-containing fuel composition by dissolving or dispersing each constituent, separately or in a mixture, with one or more solvent or dispersant agents described above.

The additional filterability additive can be present in the motor fuel or liquid hydrocarbon-containing fuel composition in a quantity ranging from 0.5 to 1000 ppm, preferably from 1 to 500 ppm, more preferably from 1 to 400 ppm. The motor fuel or liquid hydrocarbon-containing fuel composition advantageously comprises a motor fuel or liquid hydrocarbon-containing fuel selected from gas oils, diesel fuels, gasolines, biofuels, jet fuels, domestic fuel oils (DFO) and heavy fuel oils.

According to a particular embodiment, the motor fuel or liquid hydrocarbon-containing fuel composition comprises a motor fuel or other fuel selected from the middle distillates with a boiling point temperature comprised between 100 and 500° C., preferably 140 to 400° C., more preferably between 120 to 500° C., even more preferably from 140 to 400° C. These middle distillates can, for example, be selected from distillates obtained by direct distillation of crude hydrocarbons, vacuum distillates, hydrotreated distillates, distillates originating from catalytic cracking and/or hydrocracking of vacuum distillates, distillates resulting from methods of conversion of the ARDS type (by desulphurization of atmospheric residue) and/or from visbreaking, distillates originating from the upgrading of Fischer-Tropsch cuts, distillates resulting from BTL (biomass to liquid) conversion of vegetable and/or animal biomass, and/or mixtures thereof.

The motor fuels and liquid hydrocarbon-containing fuels can also contain distillates originating from refining operations that are more complex than those originating from the direct distillation of hydrocarbons. The distillates can, for example, originate from cracking, hydrocracking and/or catalytic cracking processes and visbreaking processes.

The motor fuels and liquid hydrocarbon-containing fuels can also contain new sources of distillates, among which the following may be mentioned in particular:

the heaviest cuts originating from cracking and visbreaking processes with high concentration of heavy paraffins, comprising more than 18 carbon atoms, the synthetic distillates originating from gas conversion such as those originating from the Fischer-Tropsch process, the synthetic distillates resulting from the treatment of biomass of vegetable and/or animal origin, such as in particular NexBTL, and vegetable and/or animal oils and/or esters thereof, preferably the fatty acid methyl esters (FAME) or fatty acid ethyl esters (FAEE), in particular vegetable oil methyl esters (VOME) or vegetable oil ethyl esters (VOEE), hydrotreated and/or hydrocracked and/or hydrodeoxygenated (HDO) vegetable and/or animal oils, or biodiesels of animal and/or vegetable origin.

The motor fuel or liquid hydrocarbon-containing fuel composition can comprise only new sources of distillates or can consist of a mixture with conventional petroleum middle distillates as fuel base of the diesel type and/or base of domestic fuel oil. These new sources of distillates generally comprise long paraffin chains greater than or equal to 10 carbon atoms, and preferably from $C_{14}$ to $C_{30}$. In general, the sulphur content of the motor fuel and liquid hydrocarbon-containing fuel compositions is less than 5000 ppm, preferably less than 500 ppm, and more preferably less than 50 ppm, or even less than 10 ppm and advantageously is sulphur-free, in particular for fuels of the gas oil type.

EXAMPLES

Synthesis of a Modified Alkylphenol-Aldehyde Resin According to the Invention, Designated $C_0$ In a first step, an alkylphenol-aldehyde resin is prepared by condensation of para-nonylphenol and formaldehyde (for example according to the procedure described in EP 857 776) with viscosities at 50° C. (measured at 50° C. using a dynamic rheometer with a shearing rate of $10\ s^{-1}$ on the resin diluted with 30% by weight of aromatic solvent (Solvesso 150)) comprised between 1800 and 4800 mPa·s. In a second step, the alkylphenol-aldehyde resin originating from the first step is modified by Mannich reaction by adding 2 molar equivalents of formaldehyde and 2 molar equivalents of tallow dipropylenetriamine, known under the name N-(tallowalkyl)dipropylenetriamine and marketed for example under the name Trinoram S, relative to the alkylphenol-aldehyde resin.

The characteristics of the resin obtained are presented in the following Table 1:

TABLE 1

| Resin No. | alkylamine used | Dry matter (1 g-30 min-200° C.) | Viscosity at 50° C. (mPa · s)* | Average number of phenol nuclei per molecule of resin** |
|---|---|---|---|---|
| $C_0$ | Trinoram S | 70.10% | 4855 | 14.1 |

*measured on a resin diluted with 70% by weight of Solvesso 150, shearing rate 10 s$^{-1}$ using a Haake RheoWin rheometer
**measured by nuclear magnetic resonance (NMR)

Test of Oxidation and Storage Stability
Initial Components
S: aromatic solvent marketed under the name "Solvarex 10"
$C_1$: modified alkylphenol-aldehyde resin $C_0$ diluted with 50% by weight of aromatic solvent (Solvesso 150)
$C_2$: 2,6-di-tert-butyl-4-methylphenol (BHT) (CAS number 128-37-0); purity 99% by weight
$C_3$: 2,6-di-tert-butyl-4-sec-butylphenol (CAS number 17540-75-9); purity 95% by weight
$C_4$: 2,6-di-tert-butyl-4-nonylphenol (CAS number 4306-88-1); purity 90% by weight
$C_5$: 2-tert-butyl phenol (CAS number 88-18-6) at 90% by weight
$C_6$: N,N-disalicylidene-1,2-diaminopropane (DMD; CAS number 94-91-7) diluted with 50% by weight of aromatic solvent (Solvarex 10)

Compositions $C_2$, $C_3$, $C_4$ and $C_5$ are sterically hindered phenols known to be antioxidant compounds. BHT ($C_2$) is a conventional antioxidant additive commonly used for fatty acid methyl esters (FAME), in particular for vegetable oil methyl esters (VOME). Composition $C_6$ contains DMD, a known metal sequestering/chelating additive.

Formulations $F_x$
The percentage by weight of the various components of each formulation $F_1$ to $F_4$ and of each formulation $Fc_1$ to $Fc_4$ evaluated for comparison is detailed in Table 2 below:

TABLE 2

| | $F_x$ (% by weight) | | | | | | | |
|---|---|---|---|---|---|---|---|---|
| | $F_1$ | $F_2$ | $F_3$ | $F_4$ | $F_{c1}$ | $F_{c2}$ | $F_{c3}$ | $F_{c4}$ |
| $C_1$ | 100 | 50 | 50 | 50 | | | | |
| $C_2$ | | | | | 45 | 25 | 40 | 25 |
| $C_3$ | | | 48 | | | | | |
| $C_4$ | | 50 | 48 | | | | | |

TABLE 2-continued

| | $F_x$ (% by weight) | | | | | | | |
|---|---|---|---|---|---|---|---|---|
| | $F_1$ | $F_2$ | $F_3$ | $F_4$ | $F_{c1}$ | $F_{c2}$ | $F_{c3}$ | $F_{c4}$ |
| $C_5$ | | | | | | 75 | 60 | 73 |
| $C_6$ | | 2 | 2 | | | | | 2 |
| S | | | | | 55 | | | |
| $T_{antiox}$* (%) | 50 | 70 | 68.2 | 70.6 | 45 | 92.25 | 93.6 | 91.45 |

*Level of active material corresponding to the percentage by weight of active material of the antioxidant compounds or compounds involved in the antioxidant effect, namely resin $C_0$, the hindered phenol compounds and the metal sequestering/chelating agent (DMD).

Example 1: Test of Oxidation Stability (Rancimat) and Storage Stability on a Solution of Colza Oil Methyl Esters (CME)

The antioxidant properties of different formulations $F_1$ to $F_4$ and $Fc_1$ to $Fc_4$ were evaluated by a Rancimat test according to standard DIN EN 15751, on a solution of colza oil methyl esters (CME) (marketed by the company Mosselman under the name EMC). In the context of a Rancimat test, an induction time ($T_{Ind}$) is determined, expressed in hours, following the procedure specified by standard NF EN 15751. Induction time means the time elapsed between the start of measurement and the moment when formation of oxidation products begins to increase rapidly. The induction time is representative of the oxidation stability. The more significant the induction period, the higher the oxidation stability of the CME solution. The CME solution was chosen because it has a very low value of induction time (1.5 h) and is therefore particularly discriminating.

The measurements were carried out on the initial solution of CME, designated $S^0_{CME}$, and on the solution of CME with addition of 1200 ppm of the different formulations $F_1$ to $F_4$ and $Fc_1$ to $Fc_4$, designated $S^{Fx}_{CME}$. The results are presented in Table 3 below and are represented graphically in FIG. 1.

Moreover, the weight of each formulation $F_1$ to $F_4$ and $Fc_1$ to $Fc_4$ ($m_{Fx}$) necessary in order to reach an induction time of 3.5 hours, i.e. the weight required for increasing the Rancimat of the solution $S^0_{CME}$ by 2 hours (arrow in FIG. 1), was determined graphically on the basis of the FIG. 1 obtained. The weight of active material required in order to reach an induction time of 3.5 hours was also calculated from the values "$m_{Fx}$" and from the level of the respective active material "$T_{antiox}$", for each formulation $F_1$ to $F_4$ and $Fc_1$ to $Fc_4$.

Finally, the storage stability of each solution $S^{Fx}_{CME}$ was determined for different storage temperatures, designated $T_s$. For this measurement, 50 ml of solution $S^{Fx}_{CME}$ is put in a 60-ml glass conical flask and stored at the storage temperature ($T_s$). The phase that has settled to the bottom of the flask is measured at regular time intervals, namely every 24 hours. If the deposit is less than 0.4 ml, the solution is considered to be stable. Starting from a quantity of deposit greater than 0.4 ml, the solution is considered to be unstable.

The results obtained are given in Table 3 below:

TABLE 3

| | $F_x$ | | | | | | | |
|---|---|---|---|---|---|---|---|---|
| | $F_1$ | $F_2$ | $F_3$ | $F_4$ | $F_{c1}$ | $F_{c2}$ | $F_{c3}$ | $F_{c4}$ |
| $T_{Ind}^{S_0CME}$ (h) | 1.5 | 1.5 | 1.5 | 1.5 | 1.5 | 1.5 | 1.5 | 1.5 |
| $T_{Ind}^{S_{Fx}CME}$ (h) | 11.56 | 7.06 | 7.3 | 8.17 | 3.39 | 3.3 | 4.09 | 6.06 |
| $m_{Fx}$ (ppm) | 240 | 430 | 420 | 360 | 1200 | 1200 | 940 | 540 |

TABLE 3-continued

| | $F_x$ | | | | | | | |
|---|---|---|---|---|---|---|---|---|
| | $F_1$ | $F_2$ | $F_3$ | $F_4$ | $F_{c1}$ | $F_{c2}$ | $F_{c3}$ | $F_{c4}$ |
| $m_{Fx} \times T_{antiox}$ (ppm) | 120 | 301 | 286 | 254 | 540 | 1007 | 880 | 494 |
| Storage stability | | | | | | | | |
| $T_s$ (° C.) | | | | | | | | |
| 20° C. | ++ | ++ | ++ | ++ | ++ | ++ | ++ | ++ |
| −5° C. | ++ | ++ | ++ | ++ | − | ++ | ++ | ++ |
| −10° C. | ++ | ++ | ++ | ++ | − | ++ | ++ | ++ |

"−": unstable after storage for 24 hours
"++": stable for at least 3 weeks of storage Oxidation Stability Starting from the results obtained (Table 3 and FIG. 1), it can be seen that formulation $F_1$ at 50% by weight of resin $C_0$ according to the invention is the most effective formulation as antioxidant additive. The formulations comprising resin $C_0$ according to the invention ($F_1$, $F_2$, $F_3$ and $F_4$) all have improved efficacy on the oxidation stability compared to the known formulations of antioxidant according to the prior art ($F_{c1}$, $F_{c2}$, $F_{c3}$ and $F_{c4}$). In particular, $F_1$ is more effective than $Fc_1$ containing BHT, a conventional antioxidant for FAMEs, with an induction time of 11.56 hours versus 3.39 hours. Thus, the level of treatment of the CME to reach a gain of 2 hours in the Rancimat test ($T_{Ind}$ (h)=3.5 h) is reduced by a factor of about 5. It changes from 1200 ppm for $F_{c1}$ to 240 ppm for $F_1$ or, only taking into account the quantity of active material, it changes from 540 ppm for $Fc_1$ to 120 ppm for $F_1$.

By comparing the results for $F_1$ and $F_2$, it can be seen that addition of another hindered phenol antioxidant compound ($C_4$) replacing part of the composition $C_1$ decreases the antioxidant effect of formulation $F_2$. The hindered phenol antioxidant compound $C_4$ is therefore less effective than composition $C_1$. Nevertheless, $F_2$ maintains an antioxidant effect at a level above the desired objective, namely a gain in induction time greater than 5 hours at 1200 ppm relative to the induction time of $S°_{CME}$.

Such a decrease in induction time ($T_{Ind}$) may not be found by comparing the results obtained for $Fc_1$ ($T_{ind}$=3.39) and those obtained with the formulations $Fc_2$ ($T_{ind}$=3.3) and $Fc_3$ ($T_{ind}$=4.09) corresponding to mixtures of hindered phenol compounds $C_2+C_5$. Addition of another hindered phenol antioxidant compound ($C_5$) has little effect on the efficacy of BHT ($C_2$). In fact, the formulations $Fc_1$, $Fc_2$ and $Fc_3$ have equivalent antioxidant properties (FIG. 1).

By adding 2% by weight of $C_6$ (DMD) to the mixture $C_2+C_5$, a significant increase of about 3 hours in the induction time for formulation $F_{c4}$ ($T_{Ind}$=6.06) may be found compared to $F_{c2}$ ($T_{Ind}$=3.3). The combination of a metal sequestering/chelating agent such as DMD with the conventional hindered phenol compound improves the oxidation stability considerably. Conversely, the metal sequestering/chelating agent ($C_6$) has hardly any effect on the oxidation stability when a resin $C_0$ according to the present invention is used, as shown by the results of $F_3$ ($T_{Ind}$=7.3) compared to $F_2$ ($T_{Ind}$=7.06).

Storage Stability

The formulation $F_{c1}$ containing only BHT is unstable at low temperature starting from −5° C. The formulations comprising resin $C_0$ according to the invention ($F_1$, $F_2$, $F_3$ and $F_4$) are all stable in storage not only at ambient temperature but also at low temperature, at least down to −10° C. Thus, the use of resin $C_0$ according to the invention in CME makes it possible to improve the storage stability at a temperature equal to −10° C.

Example 2: Test of Oxidation Stability (Rancimat) on an Engine Gas Oil (EGO) of Type B100

A Rancimat test according to standard DIN EN 15751 is carried out on an engine gas oil of type B100, i.e. containing 100% by volume of vegetable oil methyl esters (VOME) without addition (EGO⁰) and with addition of 1200 ppm of $F_1$ or $F_{c1}$ described above (EGO¹). The characteristics of the engine gas oil EGO⁰ are presented in Table 4 below and the results of the Rancimat test are given in Table 5.

TABLE 4

| EGO° | |
|---|---|
| CFPP (° C.) NF EN 116 | −5 |
| Cloud point (° C.) NF EN 23015 | 0 |
| MV15 (kg/m³) NF EN ISO12185 | 880 |
| Viscosity at 40° C. EN ISO 3104 | 4 |
| Oxidation stability (at 110° C., h) EN 14112 | 6.4 |
| Total aromatics (% by weight) NF EN 12916 | 18.2 |
| Polyaromatics (% by weight) NF EN 12916 | 2.5 |
| FAME content (% w/w) | 96.5 |

TABLE 5

| $F_x$ | $F_1$ | $F_{c1}$ |
|---|---|---|
| $T_{Ind}^{EGOo}$ (h) | 6.4 ± 0.1 | 6.4 ± 0.1 |
| $T_{Ind}^{EGO1}$ (h) | 8.6 ± 0.1 | 7.7 ± 0.1 |
| $\Delta T_{Ind} = (T_{Ind}^{EGO1} - T_{Ind}^{EGOo})$ (h) | 2.2 ± 0.2 | 1.3 ± 0.2 |

Use of a resin $C_0$ according to the present invention as an additive in engine gas oil of type B100 makes it possible to reach an induction time greater than 8 hours with a gain in the Rancimat test of more than 2 hours.

Example 3: Test of Oxidation Stability on a Domestic Fuel Oil (DFO)

A test of oxidation stability according to standard ISO 12205 is carried out on a heating fuel for domestic use, also called DFO ("domestic fuel oil") (DFO°), with the characteristics given in Table 6 below.

TABLE 6

| DFO° | | Distillation ASTM D86 (° C.) | |
|---|---|---|---|
| Total paraffins (% by weight) | 12.95 | 0% | 158.6 |
| CFPP (° C.) - NF EN 116 | −5 | 5% | 183.7 |
| Pour point (° C.) - NF-T60-105 | −12 | 10% | 194 |
| Cloud point (° C.) - NF EN 23015 | −5 | 20% | 215.4 |
| MV15 (kg/m$^3$) - NF EN ISO12185 | 829.23 | 30% | 236.1 |
| Sulphur content (mg/kg) | 7.80 | 40% | 255.60 |
| Monoaromatics (% by weight) - NF EN 12916 | 15.7 | 50% | 273.6 |
| Diaromatics (% by weight) - NF EN 12916 | 2 | 60% | 289.1 |
| Triaromatics (% by weight) - NF EN 12916 | 0.5 | 70% | 303.7 |
| Total aromatics (% by weight) - NF EN 12916 | 18.2 | 80% | 319.5 |
| Polyaromatics (% by weight) - NF EN 12916 | 2.5 | 90% | 337.1 |
| VOME content (vol %) | 0 | 95% | 350 |
| | | 100% | 358.6 |

The principle of the test according to standard ISO 12205 consists of exposing the test sample to a temperature of 95° C. for a period of 16 hours. Then the sample is cooled to ambient temperature and filtered in order to determine the quantity of deposits generated. The test was also carried out on a sample of DFO$^1$ corresponding to the pure DFO (DFO°) with addition of 120 ppm of formulation $F_1$ described above (50% of active material).

The results of the tests of oxidation stability are given in Table 7 below:

TABLE 7

| | Oxidation stability EN 12205 - unit g/m$^3$ |
|---|---|
| DFO° | 204.3 |
| DFO$^1$ | 43.23 |
| % reduction in deposits | 78.8% |

A substantial decrease in deposits is seen, with a reduction in deposits of nearly 79%. Thus, it is deduced from this that the use of resin $C_0$ according to the invention makes it possible to reduce the quantity of deposits formed during storage of DFO significantly (about 80%).

The modified alkylphenol-aldehyde resins according to the invention have particularly remarkable properties as antioxidant additive for motor fuel or hydrocarbon-containing fuel compositions, in particular such as gas oils, diesel fuels, gasolines, biofuels, jet fuels, domestic fuel oils (DFO) and heavy fuel oils. The modified alkylphenol-aldehyde resins according to the invention are particularly effective for the motor fuel or liquid hydrocarbon-containing fuel compositions that comprise vegetable and/or animal oils and/or esters thereof. The modified alkylphenol-aldehyde resins are particularly suitable for biodiesels of animal and/or vegetable origin, alone or mixed with other compositions of motor fuels or other fuels. In particular, the modified alkylphenol-aldehyde resins according to the invention improve the oxidation stability and/or storage stability of motor fuel or liquid hydrocarbon-containing fuel compositions that comprise up to 100% by weight of fatty acid methyl esters (FAME) or fatty acid ethyl esters (FAEE), in particular vegetable oil methyl esters (VOME) or vegetable oil ethyl esters (VOEE).

The invention claimed is:

1. A method of using at least one modified alkylphenol-aldehyde resin, the method comprising using the at least one modified alkylphenol-aldehyde resin as an additive for improving the oxidation and/or storage stability of a motor fuel or liquid hydrocarbon-containing fuel composition, the modified alkylphenol-aldehyde resin being obtainable by a Mannich reaction of an alkylphenol-aldehyde condensation resin,
   with at least one aldehyde and/or one ketone having from 1 to 8 carbon atoms;
   and at least one hydrocarbon-containing compound having at least one alkylmonoamine or alkylpolyamine (alkylamine) group, having between 1 and 30 carbon atoms;
   the alkylphenol-aldehyde condensation resin itself being obtainable by condensation of at least one alkylphenol substituted with at least one linear or branched alkyl group having from 1 to 30 carbon atoms; and
   with at least one aldehyde and/or one ketone having from 1 to 8 carbon atoms.

2. The method according to claim 1, further comprising improving the storage stability of the motor fuel or liquid hydrocarbon-containing fuel composition at a temperature less than 0° C.

3. The method according to, claim 1 further comprising reducing the quantity of deposits formed during storage of the motor fuel or liquid hydrocarbon-containing fuel composition.

4. The method according to claim 1, wherein the modified alkylphenol-aldehyde resin is used as an additive in a form diluted in a solvent.

5. The method according to claim 1, wherein the modified alkylphenol-aldehyde resin is used in the motor fuel or liquid hydrocarbon-containing fuel composition in combination with one or more additional additives.

6. The method according to claim 5, wherein the additional additives are selected from dispersants/detergents, carrier oils, metal deactivators, metallic passivators, antioxidants, dyes, antistatic additives, corrosion inhibitors, biocides, markers, thermal stabilizers, emulsifiers, friction reducing agents, surfactants, cetane improvers, anti-clouding agents, additives improving the conductivity, reodorants, lubricity additives, lubricants and mixtures thereof.

7. The method according to claim 1, further comprising adding an amount of modified alkylphenol-aldehyde resin comprised between 5 and 5000 ppmw, to the motor fuel or liquid hydrocarbon-containing fuel composition.

8. The method according to claim 1, wherein the motor fuel or liquid hydrocarbon-containing fuel composition comprises a motor fuel or liquid hydrocarbon-containing fuel selected from gas oils, diesel fuels, gasolines, biofuels, jet fuels, domestic fuel oils (DFO) and heavy fuel oils.

9. The method according to claim 1, wherein the motor fuel or liquid hydrocarbon-containing fuel composition comprises a motor fuel or other fuel selected from the middle distillates with a boiling point temperature comprised between 100 and 500° C.

10. The method according to claim 1, wherein the motor fuel or liquid hydrocarbon-containing fuel composition comprises vegetable and/or animal oils and/or esters thereof and/or biodiesels of animal and/or vegetable origin.

11. The method according to claim 10, wherein the esters are fatty acid methyl esters (FAME) or fatty acid ethyl esters (FAEE).

12. The method according to claim 11, wherein the motor fuel or liquid hydrocarbon-containing fuel composition is a biodiesel of type B100 and whose value of induction time ($T_{ind}$) obtained by a Rancimat test according to standard DIN EN 15751 is greater than or equal to 8 hours.

13. The method according to claim 12, wherein a gain in value of induction time ($\Delta T_{ind}$) obtained by the Rancimat test according to standard DIN EN 15751 is greater than or equal to 2.

14. The method according to claim 1, wherein the modified alkylphenol-aldehyde resin can be obtained from at least one para-substituted alkylphenol.

15. The method according to 1, wherein the modified alkylphenol-aldehyde resin can be obtained starting from at least one aldehyde and/or one ketone selected from formaldehyde, acetaldehyde, propionaldehyde, butyraldehyde, 2-ethylhexanal, benzaldehyde, acetone.

16. The method according to claim 1, wherein the modified alkylphenol-aldehyde resin is obtained starting from at least one alkylamine having at least one primary amine group.

17. The method according to claim 1, wherein the modified alkylphenol-aldehyde resin can be obtained starting from at least one fatty-chain alkylamine or from a mixture of fatty-chain alkylamines, having a number of carbon atoms between 12 and 24.

18. The method according to claim 1, wherein the modified alkylphenol-aldehyde resin is obtainable by a Mannich reaction of an alkylphenol-aldehyde condensation resin
  with at least one aldehyde and/or one ketone having from 1 to 4 carbon atoms;
  and at least one hydrocarbon-containing compound having at least one alkylmonoamine or alkylpolyamine (alkylamine) group, having between 4 and 30 carbon atoms;
  the alkylphenol-aldehyde condensation resin itself being obtainable by condensation of at least one monoalkylphenol having from 1 to 30 carbon atoms; and
  with at least one aldehyde and/or one ketone having from 1 to 4 carbon atoms.

19. The method according to claim 11, wherein the esters are fatty acid methyl esters (FAME) or fatty acid ethyl esters (FAEE) selected from vegetable oil methyl esters (VOME) or vegetable oil ethyl esters (VOEE).

20. The method according to claim 14, wherein the modified alkylphenol-aldehyde resin can be obtained from p-nonylphenol.

* * * * *